United States Patent [19]
Windish et al.

[11] 4,170,152
[45] Oct. 9, 1979

[54] TRANSMISSION ARRANGEMENT

[75] Inventors: Willis E. Windish, Pekin; James E. Winzeler, East Peoria, both of Ill.

[73] Assignee: Caterpillar Tractor Co., Peoria, Ill.

[21] Appl. No.: 813,587

[22] Filed: Jul. 7, 1977

[51] Int. Cl.² .......................................... F16H 57/02
[52] U.S. Cl. ................................................. 74/606 R
[58] Field of Search ............... 74/606 R, 606 A, 15.6, 74/15.63, 15.66, 710

[56] References Cited

U.S. PATENT DOCUMENTS

| | | | |
|---|---|---|---|
| 1,331,139 | 2/1920 | Barnes | 74/606 |
| 2,140,687 | 12/1938 | Brown | 74/15.6 |
| 2,264,785 | 12/1941 | Ash | 74/710 |
| 2,800,803 | 7/1957 | Bechman | 74/15.63 |
| 2,945,382 | 7/1960 | Ritter | 74/15.63 |
| 3,550,474 | 11/1968 | Maurice et al. | 74/606 R |

Primary Examiner—Samuel Scott
Assistant Examiner—Gerry Anderson
Attorney, Agent, or Firm—Charles F. Lanchantin, Jr.

[57] ABSTRACT

A transmission arrangement for a vehicle having a normal longitudinal direction of movement includes a housing assembly, a transmission having an output shaft, the transmission being mounted within the housing assembly, a transfer gear train driven by the output shaft and mounted within the housing assembly, and a bevel gear and cross shaft assembly mounted within the housing assembly and driven by the transfer gear train, the bevel gear and cross shaft assembly being located longitudinally between the transmission and the transfer gear train.

12 Claims, 4 Drawing Figures

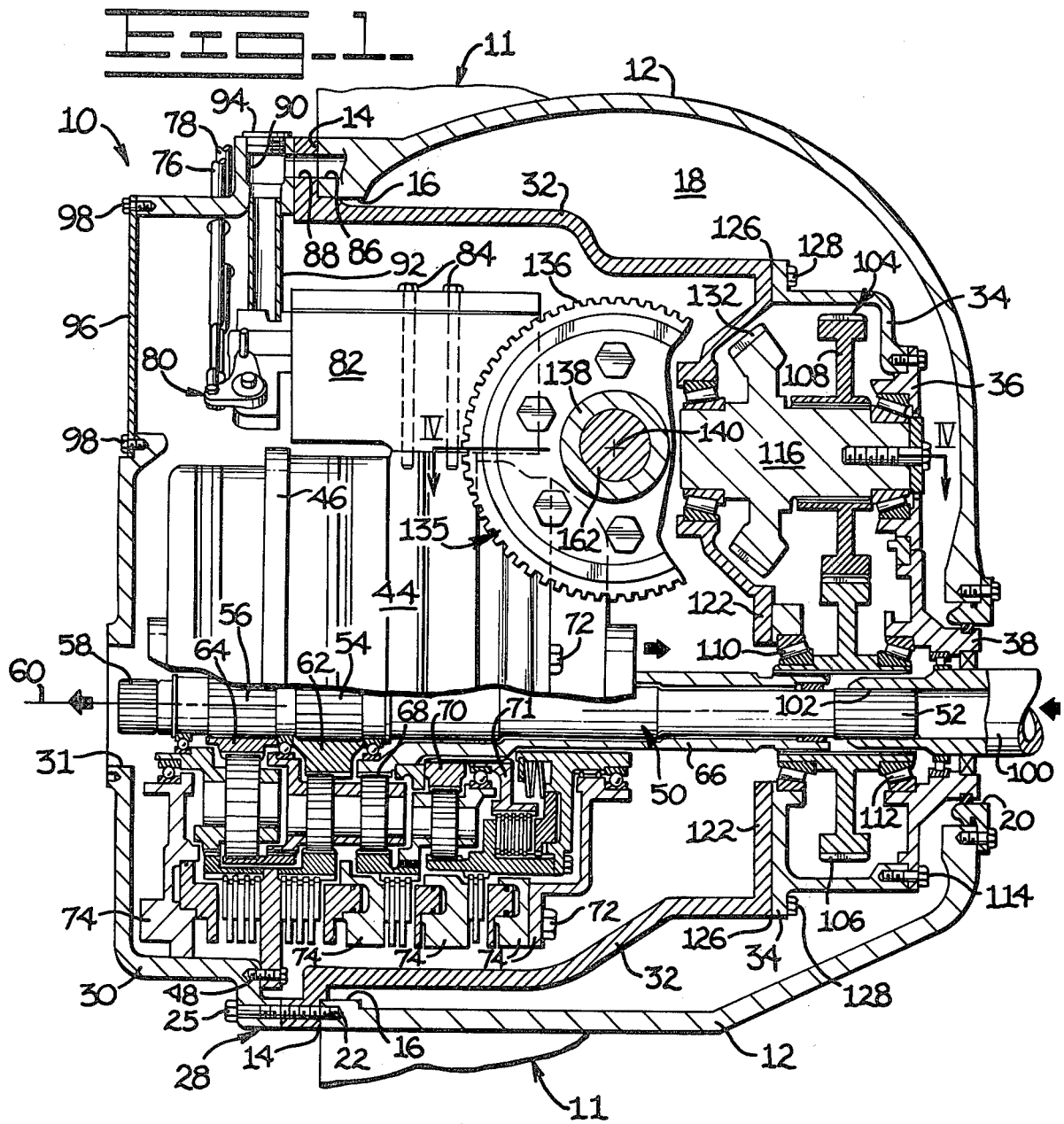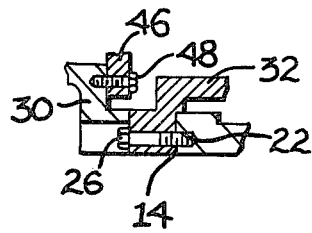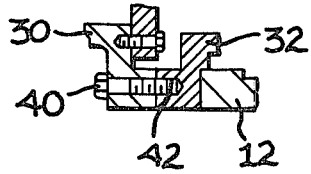

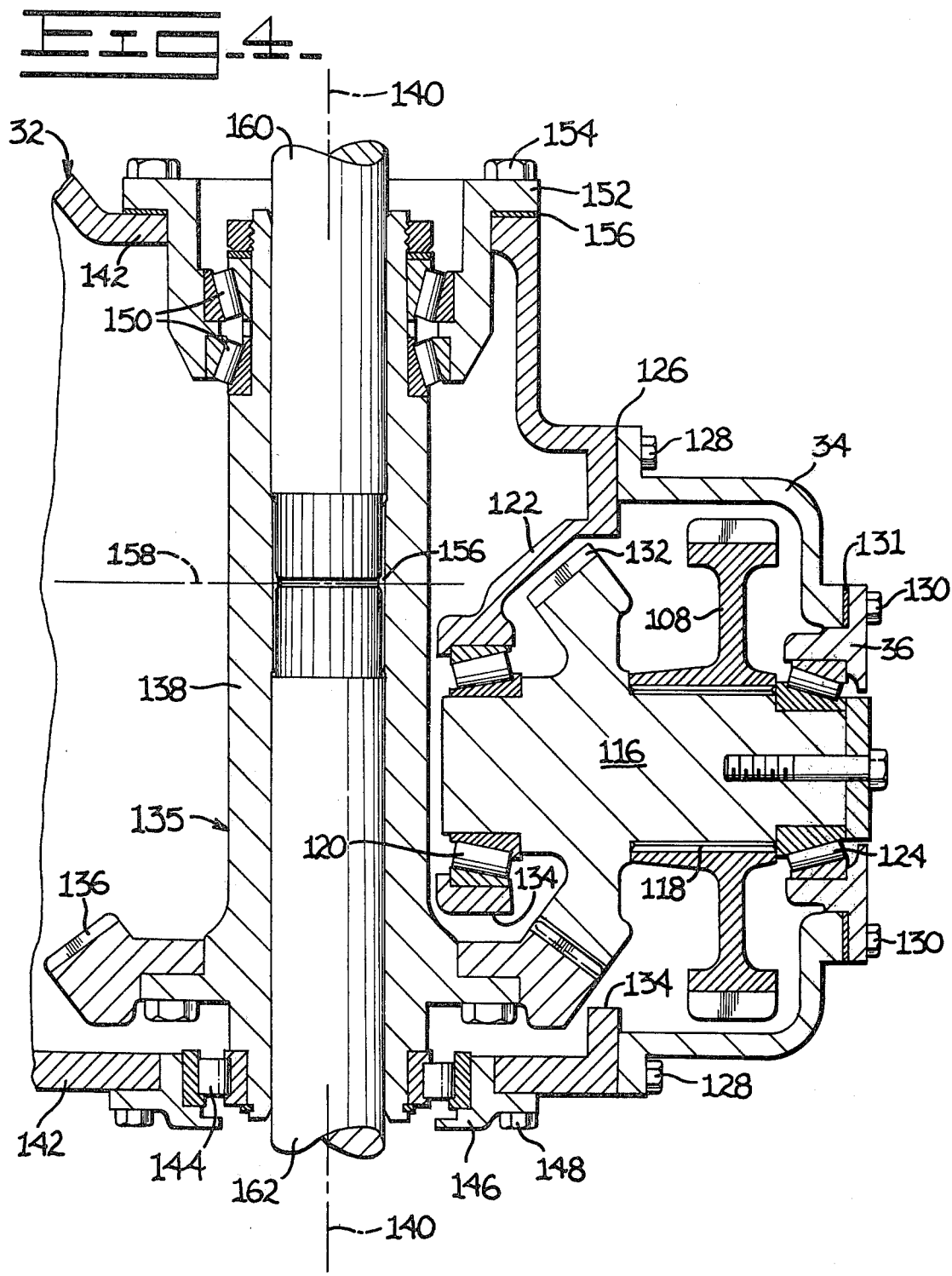

TRANSMISSION ARRANGEMENT

BACKGROUND OF THE INVENTION

The present invention is related to a transmission arrangement for a vehicle, and more particularly to a transmission arrangement which is located at the rear end of the vehicle for improved servicing and which has an axially compact relationship between the major components thereof.

Heretofore, transmission and power train arrangements for vehicles such as large earthmoving tractors have been excessively long because it has been a problem to align the longitudinally oriented engine driven output shaft, the multispeed transmission, and a suitable transfer gear train with the transversely oriented bevel gear and cross shaft assembly. Since the bevel gear delivers power to the cross shafts, the opposite steering clutches and brakes, the final drives, and the associated sprockets or wheels that propel the vehicle, it is normally of large diameter and substantial clearance is required for proper mounting thereof. Particularly, the axis of the bevel gear and cross shafts must be elevationally offset from the axis of the engine driven output shaft in order for the various elements to clear one another. In such instance at least one transfer gear train is provided between the output of the transmission and the bevel gear driving pinion and this requires considerable space. Another disadvantage of these long transmission and power train arrangements is that they often extend rearwardly and outwardly to a point where the elements thereof are exposed to possible damage or to a point where they interfere with the proper placement and mounting of auxiliary equipment on the rear of the vehicle.

Another problem concerns the difficulties associated with servicing transmission arrangements of the above noted type. In the past they have been located in the central portion of the tractor immediately behind the engine so that it has been necessary to disconnect and remove substantial portions of the operator station and/or associated tractor components in order to provide access to the transmission arrangement and to allow lifting or lowering of major elements thereof from within the confines of the tractor for separate servicing.

SUMMARY OF THE INVENTION

The present invention is directed to overcoming one or more of the problems as set forth above.

According to the present invention there is provided a transmission arrangement for a vehicle having a normal longitudinal direction of movement which includes a housing assembly, a transmission having an output shaft, the transmission being mounted within the housing assembly, a transfer gear train driven by the output shaft and mounted within the housing assembly, and a bevel gear and cross shaft assembly mounted within the housing assembly and driven by the transfer gear train, the bevel gear and cross shaft assembly being located longitudinally between the transmission and the transfer gear train.

BRIEF DESCRIPTION OF THE DRAWINGS

FIG. 1 is a diagrammatic side elevational sectional view of a transmission arrangement constructed in accordance with the present invention with certain portions shown in elevation for illustrative convenience.

FIG. 2 is a fragmentary sectional view of the transmission arrangement of FIG. 1 taken at a circumferentially offset location.

FIG. 3 is another sectional view like FIG. 2 circumferentially offset therefrom.

FIG. 4 is a diagrammatic horizontal sectional plan view of the transmission arrangement of the present invention as taken along line IV—IV of FIG. 1.

DETAILED DESCRIPTION

Referring to FIG. 1, there is shown a transmission arrangement 10 for a vehicle 11, which arrangement forms a substantial portion of a vehicle power train or drive line such as is utilized in the earthmoving tractor disclosed in U.S. Pat. No. 3,871,462, issued Mar. 18, 1975 to R. L. Krolak, et al. Accordingly, it is to be appreciated that the vehicle has a front and rear ends which are disposed generally to the right and left sides respectively when viewing FIG. 1, which directions correspond to a normal longitudinal direction of movement of the vehicle.

A rigid frame or case 12 is provided at the rear of the vehicle 11 which forms a substantially integral part of the body of the vehicle. The case has an upright rear mounting face 14 peripherally disposed about a relatively large rearwardly facing opening 16, an internal chamber 18, and a cylindrical opening 20 through the front thereof. Also, a plurality of longitudinally oriented threaded bores 22 are formed in the case 12, at the rear mounting face 14 thereof. Advantageously, the transmission arrangement 10 extends forwardly through the opening 16 and into the chamber 18 within the case, and is releasably secured thereto by a plurality of relatively long retaining members or capscrews 25 and a plurality of relatively short retaining members or capscrews 26 disposed generally in alternating and encircling relation about the opening 16 and screw threadably received in the bores 22 as may be appreciated by reference to FIGS. 1 and 2.

More particularly, the transmission arrangement 10 includes a housing assembly 28 having a rear cover 30 with an opening 31 therein, a central bevel gear housing 32, a front transfer gear train support housing 34, and an upper bearing support member 36 and a lower bearing support member 38. As shown in FIG. 3 the rear cover 30 and the bevel gear housing 32 are releasably connected together by a plurality of retaining members or capscrews 40 disposed on substantially the same circle as the capscrews 25 and 26, but circumferentially offset therefrom. The capscrews 40 extend through the rear cover 30 and are received in a corresponding plurality of threaded bores 42 in the central bevel gear housing 32.

As shown in FIG. 1, a conventional power shift transmission 44 including several epicyclic gear sets is conditioned to transmit torque at various gear ratios depending on which of the several clutches and brakes are engaged. The transmission has an annular mounting plate 46 and is mounted within the housing assembly 28. Preferably, the mounting plate thereof is releasably connected to the rear cover 30 by a plurality of retaining members or capscrews 48 piercing the plate and screw threadably received in the cover 30. In the instant example, the transmission includes an input shaft 50 having an input spline or coupling 52 at the front end, and first, second and third splines or couplings 54, 56, 58 at the rear end which are concentrically disposed on a longitudinal axis 60. A pair of sun gears 62 and 64 are respectively coupled to the splines 54 and 56 to provide the input drive to the transmission, and a hollow output shaft 66 having an integral sun gear 68, a spline-connected sun gear 70, and a spline-connected rotating clutch gear 71 provides the output from the transmission. A plurality of circumferentially spaced tie bolts 72 extend through a plurality of stacked annular elements 74 which serve as a transmission housing assembly. The tie bolts thereby clamp the elements of the transmission together and secure them to the generally centrally disposed mounting plate 46. Through the selective operation of the individual epicyclic or planetary gear sets within the transmission three forward and three reverse speeds are obtainable at the output shaft, it not being necessary to fully understand either the details of construction of, or the operation of the transmission 44 to gain an appreciation for the construction of the present invention. Basically, however, the transmission is selectively operated by a pair of control elements 76 and 78 which extend downwardly through the rear cover 30 and are releasably connected to suitable mechanisms, indicated generally by the reference numeral 80, leading to a fluid operated transmission control apparatus 82. Advantageously, the control apparatus is releasably connected to the top of the transmission through a plurality of retaining bolts 84. Fluid is supplied under pressure to the control apparatus for operation of the epicyclic gear sets through a plurality of serially arranged passages 86, 88 and 90 in the case 12, the bevel gear housing 32 and the rear cover 30 and through a releasable tube 92 sealingly connected to the cover. A cap 94 is screw threadably connected to the cover to allow the tube to be withdrawn upwardly for servicing purposes. An access cover 96 is releasably connected to the rear cover by a plurality of capscrews 98 to permit excess to the control mechanism 80 and the transmission control apparatus 82 for servicing.

As shown at the right side when viewing FIG. 1, an engine and torque converter driven shaft 100 extends rearwardly through the opening 20 in the case 12, and is provided with an internal coupling or splines 102 for mating engagement with the splines 52 of the transmission input shaft 50. It may therefor be observed that the shaft 100 is arranged on the axis 60 and is axially releasably engaged with the shaft 50.

The transmission arrangement 10 further includes a transfer gear train 104 having a lower gear 106 and an upper gear 108 intermeshingly connected together. The lower gear is mounted for rotation about the axis 60 by a first tapered rolling bearing assembly 110 mounted in the support housing 34 and a second opposed tapered rolling bearing assembly 112 mounted in the support member 38. Thus the lower gear is installed on the first bearing assembly 110 and then the support member 38 and the second bearing assembly 112 are preassembled thereon by screw threaded engagement of a plurality of capscrews 114 into the support housing 34.

The upper gear 108, however, is releasably mounted on a pinion gear shaft 116 through a splined coupling 118 as is shown more clearly in FIG. 4. The pinion gear shaft 116 is mounted in a first tapered rolling bearing assembly 120 seated in a front wall 122 of the bevel gear housing 32, and also is mounted in a second opposed tapered rolling bearing assembly 124 seated in the upper bearing support member 36. However, the pinion gear shaft 132 and the upper gear 108 as an assembly are initially seated on the first tapered rolling bearing assembly 120 and the support housing 34, including the preassembled lower gear 106, moved toward the front wall 122 until they contact one another around their peripheries at a mounting face 126. A plurality of retaining members or capscrews 128 are then screw threadably secured into the case 32 to clamp these components together. Thus the upper gear and the pinion gear shaft are also preassembled in place, with further adjustment of the bearings 120 and 124 achieved by rearward or forward movement of the support member 36 on the support housing upon screw threaded engagement of a plurality of capscrews 130 into the support housing 34 and by use of one or more shims 131.

Referring further to FIG. 4, the pinion gear shaft 116 has a transversely oriented and integral pinion gear 132 which extends through an opening 134 in the front wall 122 of the bevel gear housing 32 to be in intermeshing and driving engagement with a bevel gear and cross shaft assembly 135 having an annular bevel gear 136. The bevel gear is preferably releasably secured to a hollow bevel gear shaft 138 which is rotatably supported on a transverse axis 140 between a pair of opposite side walls 142 of the bevel gear housing. This is achieved at one end by supporting the bevel gear shaft on a rolling bearing assembly 144 seated in an annular support member 146 releasably secured to the side wall by a plurality of capscrews 148. At the opposite end, a pair of opposed tapered rolling bearing assemblies 150 are mounted between the bevel gear shaft and an annular support member 152 releasably secured to the wall by a plurality of capscrews 154. Adjustment of the bevel gear relative to the pinion gear is thus easily accomplished by utilizing one or more shims 156 between the respective mounting faces of the support member 152 and only one of the side walls 142.

As shown in FIG. 4, the hollow bevel gear shaft 138 has an internal coupling or spline 156 substantially transversely centered on a longitudinally oriented upright plane 158 passing through the center of the vehicle 11. Connected to this spline are a pair of cross shafts 160 and 162 leading to the opposite steering clutches and brakes, the final drives, and the ground-engaging elements of the vehicle, not shown, for propelling it in the desired manner.

OPERATION

In operation, the engine driven shaft 100 shown in FIG. 1 drives the input shaft 50, the input sun gears 62 and 64 of the transmission 44, and the spline 58 which serves as a power take-off element for driving an auxiliary component such as a winch, not shown, releasably connected to the rear cover 30. Through operator manipulation, the control elements 76 and 78 are moved to correspondingly displace the elements of the mechanism 80 and thereby the transmission control apparatus 82 to effect any one of a plurality of forward or reverse speeds, or neutral, in the transmission. Accordingly, the output shaft 66 from the transmission is rotated at the desired speed and direction to drive the transfer gear train 104. This drives the pinion gear 132 and bevel gear 136 to impart the desired rotation to the cross shafts 160 and 162 for driving the vehicle.

Importantly, the transmission arrangement 10 can be removed rearwardly from the case 12 as a unit by screw threadably releasing the capscrews 25 and 26 subsequent to withdrawing the cross shafts 160 and 162 laterally outwardly from within the hollow bevel gear shaft 138. Separation occurs at the rear mounting face 14 and at the front splines 52 and 102, and the bearing support member 38 moves rearwardly away from the shaft 100 and the opening 20. This permits convenient access to the transfer gear train 104, which may be serviced by separating the front support housing 34 from the bevel gear housing 32 by screw threaded release of the capscrews 128.

Alternately, the transmission 44 may be removed from the rear of the vehicle 11 without complete withdrawal of the entire transmission arrangement 10. Particularly, as shown in FIGS. 1 and 3, the capscrews 25 and 40 may be screw threadably released from the case 12 and the bevel gear housing 32 whereupon the rear cover 30, the transmission connected to the rear cover by the capscrews 48, and the control apparatus 82 may be separated from the case 12 and the bevel gear housing. Under such conditions the capscrews 26 illustrated in FIG. 2 hold the bevel gear housing 32, and thus the bevel gear and cross shaft assembly 135 and the transfer gear train 104, against the case 12.

Furthermore, to effect relatively limited servicing of the control apparatus 82 and associated components it is only necessary to remove the access cover 96 by release of the capscrews 98. If more substantial servicing thereof is desired the control elements 76 and 78 are disconnected and raised from the mechanism 80, the tube 92 is also withdrawn upwardly after the cap 94 is removed, and the control apparatus 80 can thereafter be taken rearwardly out of the housing 32 upon releasing the tie bolts 84 from the top of the transmission 44.

In view of the foregoing, it is readily apparent that the transmission arrangement of the present invention may be easily removed rearwardly from the vehicle for servicing as a unit without the need for disassembling substantial portions of the vehicle and including the usual operator station and/or other components disposed elevationally above or below the transmission arrangement. Furthermore, while the transmission arrangement may be removed as a relatively complete unit from its protected position, certain major elements thereof are separately removable rearwardly from the case of the vehicle for individualized service. Also, a relatively longitudinally short arrangement of the transmission 44, the transfer gear train 104 and the bevel gear and cross shaft assembly 135 is provided by the construction of the present invention primarily because the bevel gear and cross shaft assembly is disposed longitudinally between the transmission and transfer gear train and elevationally above the central axis 60 so that it is compactly nested therewith.

Other aspects, objects and advantages of this invention can be obtained from a study of the drawings, the disclosure, and the appended claims.

The embodiments of the invention in which an exclusive property or privilege is claimed are defined as follows:

1. A transmission arrangement for a vehicle having a longitudinal axis, a rearwardly disposed case, and a rear opening defined in said case, comprising:
    a housing assembly of a construction sufficient for extending forwardly through said rear opening and being releasably secured to said case about the periphery of said opening;
    a transmission having an output shaft located on said axis, said transmission being mounted within said housing assembly;
    a transfer gear train driven by said output shaft and mounted within said housing assembly; and
    a bevel gear and cross shaft assembly mounted within said housing assembly on a transverse axis located elevationally above said longitudinal axis and driven by said transfer gear train, said bevel gear and cross shaft assembly being located longitudinally between said transmission and said transfer gear train.

2. The transmission arrangement of claim 1 wherein said housing assembly has a releasable rear cover and said transmission is releasably connected to said rear cover and axially movable therewith.

3. The transmission arrangement of claim 2 including an input shaft disposed on said first axis and extending through said output shaft to a rear portion of said transmission.

4. The transmission arrangement of claim 3 wherein said releasable cover has an opening therein and said input shaft has a power take-off member accessible through said opening in the cover.

5. A transmission arrangement for a vehicle having a longitudinal axis and a vehicle case having an opening therein, comprising:
    a housing assembly having a bevel gear housing and a rear cover, said bevel gear housing being releasably connected to said case and said rear cover being releasably connected to said bevel gear housing;
    a transmission having an output shaft located on said axis, said transmission mounted within said housing assembly;
    a transfer gear train driven by said output shaft and mounted within said housing assembly; and
    a bevel gear and cross shaft assembly mounted within said housing assembly and driven by said transfer gear train, said bevel gear and cross shaft assembly being located longitudinally between said transmission and said transfer gear train.

6. The transmission arrangement of claim 5 wherein said transmission has a mounting plate, said mounting plate being releasably connected to said rear cover and of a construction sufficient for supporting said transmission on said rear cover.

7. The transmission arrangement of claim 6 wherein said transmission includes control means for operationally controlling said transmission, and said rear cover includes a releasable plate providing serviceability access to said control means.

8. A transmission arrangement for a vehicle having front and rear ends arranged at the opposite ends of a longitudinal axis, comprising:
    a case having a rearwardly facing opening therein, said case being located at said rear end of the vehicle;
    a housing assembly releasably connected to said case and extending forwardly therein;
    a transmission mounted within said housing assembly;
    a bevel gear and cross shaft assembly mounted within said housing assembly; and
    means connected to said transmission for driving said bevel gear and cross shaft assembly, said means being mounted within said housing assembly.

9. The transmission arrangement of claim 8 wherein said transmission is arranged on a first axis, said bevel gear and cross shaft assembly is arranged on a second axis elevationally above said first axis, and said means is a transfer gear train extending therebetween.

10. The transmission arrangement of claim 9 wherein said bevel gear and cross shaft assembly is located longitudinally between said transmission and said transfer gear train.

11. The transmission arrangement of claim 8 wherein said housing assembly includes a bevel gear housing and a rear cover, said bevel gear housing being connected to said case and said rear cover being connected to said bevel gear housing.

12. The transmission arrangement of claim 11 wherein said transmission is releasably mounted on said rear cover.

* * * * *